US012600315B2

(12) United States Patent
Treglown

(10) Patent No.: US 12,600,315 B2
(45) Date of Patent: Apr. 14, 2026

(54) KNEE AIRBAG FOR A VEHICLE

(71) Applicant: Autoliv ASP, Inc., Ogden, UT (US)

(72) Inventor: Aaron Treglown, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 19/039,350

(22) Filed: Jan. 28, 2025

(65) Prior Publication Data

US 2025/0170981 A1 May 29, 2025

Related U.S. Application Data

(63) Continuation of application No. 18/380,737, filed on Oct. 17, 2023, now Pat. No. 12,257,971.

(51) Int. Cl.
| *B60R 21/231* | (2011.01) |
| *B60R 21/20* | (2011.01) |
| *B60R 21/235* | (2006.01) |

(52) U.S. Cl.
CPC ............ *B60R 21/231* (2013.01); *B60R 21/20* (2013.01); *B60R 21/235* (2013.01); *B60R 2021/23169* (2013.01); *B60R 2021/23547* (2013.01)

(58) Field of Classification Search
CPC .................. B60R 21/235; B60R 21/20; B60R 2021/23169; B60R 2021/23316; B60R 2021/23324; B60R 2021/23547; B60R 21/206; B60R 2021/23176; B60R 2021/0053
See application file for complete search history.

(56) References Cited

U.S. PATENT DOCUMENTS

| 6,382,662 | B1 | 5/2002 | Igawa |
| 7,434,837 | B2 | 10/2008 | Hotta et al. |
| 8,029,016 | B2 | 10/2011 | Moritani |
| 8,746,734 | B1 | 6/2014 | Smith et al. |
| 9,592,787 | B2 | 3/2017 | Jung et al. |
| 9,944,248 | B2 | 4/2018 | Rahman et al. |

(Continued)

FOREIGN PATENT DOCUMENTS

| CN | 114043959 A | 2/2022 |
| DE | 60305374 T2 | 5/2007 |

(Continued)

OTHER PUBLICATIONS

U.S. Appl. No. 18/372,728, filed Sep. 26, 2023.

(Continued)

*Primary Examiner* — Paul N Dickson
*Assistant Examiner* — Matthew D Lee
(74) *Attorney, Agent, or Firm* — Harness, Dickey & Pierce, P.L.C.

(57) ABSTRACT

A knee airbag includes a front panel, a rear panel and an intermediate panel. The rear panel is coupled to the front panel to define an inflation chamber. The intermediate panel is disposed between the front panel and the rear panel and within the inflation chamber. The intermediate panel is connected to the rear panel by rows of first attachment points extending in a lateral direction across the knee airbag and connected to the front panel by rows of second attachment points extending in the lateral direction. The airbag includes a proximal bending area proximate a proximal end thereof.

13 Claims, 12 Drawing Sheets

(56) References Cited

U.S. PATENT DOCUMENTS

| 2003/0184069 A1* | 10/2003 | Takimoto | B60R 21/217 |
| | | | 280/743.1 |
| 2003/0193174 A1* | 10/2003 | Abe | B60R 21/206 |
| | | | 280/730.1 |
| 2004/0251665 A1* | 12/2004 | Kumagai | B60R 21/2165 |
| | | | 280/730.1 |
| 2005/0127643 A1* | 6/2005 | Abe | B60R 21/2338 |
| | | | 280/743.2 |
| 2005/0253367 A1 | 11/2005 | Heigl | |
| 2007/0145730 A1 | 6/2007 | Choi | |
| 2007/0222189 A1 | 9/2007 | Baumbach et al. | |
| 2009/0085333 A1 | 4/2009 | Imaeda et al. | |
| 2010/0253051 A1 | 10/2010 | Moritani | |
| 2010/0270780 A1* | 10/2010 | Moritani | B60R 21/237 |
| | | | 280/730.1 |
| 2011/0095512 A1 | 4/2011 | Mendez | |
| 2014/0291972 A1 | 10/2014 | Fukawatase et al. | |
| 2016/0002831 A1 | 1/2016 | Becker et al. | |
| 2016/0046253 A1* | 2/2016 | Jung | B60R 21/206 |
| | | | 280/729 |
| 2016/0059815 A1* | 3/2016 | Jung | B60R 21/237 |
| | | | 280/730.1 |
| 2017/0136874 A1 | 5/2017 | Harris et al. | |
| 2019/0039551 A1* | 2/2019 | Patel | B60R 21/231 |
| 2020/0017061 A1* | 1/2020 | Rutgersson | B60R 21/231 |
| 2020/0276953 A1 | 9/2020 | Enders | |
| 2022/0055568 A1 | 2/2022 | Ruffner et al. | |
| 2022/0097642 A1 | 3/2022 | Albiez et al. | |
| 2025/0333019 A1* | 10/2025 | Heo | B60R 21/261 |

FOREIGN PATENT DOCUMENTS

| DE | 102016001918 A1 | | 8/2017 | |
| DE | 102019109901 A1 | | 10/2020 | |
| JP | 2005186886 A | | 7/2005 | |
| JP | 2005271703 A | * | 10/2005 | B60R 21/206 |
| JP | 4954003 B2 | | 6/2012 | |
| WO | 2009054260 A1 | | 4/2009 | |
| WO | WO-2010081503 A1 | * | 7/2010 | B60R 21/2338 |
| WO | 2017140521 A1 | | 8/2017 | |
| WO | 2023066623 A1 | | 4/2023 | |
| WO | 2023/135263 A1 | | 7/2023 | |
| WO | 2024038040 A1 | | 2/2024 | |

OTHER PUBLICATIONS

International Search Report and Written Opinion of the ISA issued in PCT/US2024/013972, mailed May 14, 2024; ISA/US.

Non-Final Office Action regarding U.S. Appl. No. 18/372,728, dated Jun. 21, 2024.

Albiez , Airbag With at Least Three Layers, Said Airbag Being Woven Into a Part, Apr. 27, 2023, EPO, WO 2023066623 A 1, Machine Translation of Description (Year: 2023).

International Search Report and Written Opinion of the ISA issued in PCT/US2024/039509, mailed Oct. 1, 2024; ISA/EP.

International Search Report and Written Opinion of the ISA issued in PCT/US2024/047135, mailed Jan. 8, 2025; ISA/EP.

* cited by examiner

KNEE AIRBAG FOR A VEHICLE

CROSS-REFERENCE TO RELATED APPLICATIONS

This application is a continuation of U.S. patent application Ser. No. 18/380,737 filed on Oct. 17, 2023. The entire disclosure of the above application is incorporated herein by reference.

FIELD

The present disclosure generally concerns inflatable occupant restraint systems for vehicles. More particularly, the present disclosure relates to a knee airbag arrangement for a vehicle.

BACKGROUND

This section provides background information related to the present disclosure which is not necessarily prior art.

Inflatable occupant restraints or airbags are commonly included on motor vehicles for passive occupant protection. Airbags used for frontal impact protection are generally installed in the vehicle steering wheel for the driver and behind the vehicle instrument panel for other front seat occupants. In addition to frontal impact protection, inflatable restraints are used for occupant protection from side impacts. For example, side curtain airbags are typically mounted along the roof rail of a vehicle and deploy in a downward direction to provide an energy absorbing structure between the head and upper torso of an occupant and the vehicle interior components.

In the event of an accident or impending accident, a sensor within the vehicle measures abnormal deceleration, for example, the airbag is triggered to inflate within a few milliseconds with gas produced by a device commonly referred to as an "inflator". The inflated airbag cushions the vehicle occupant from impact forces.

Inflatable occupant restraint systems may include a knee airbag arrangement for protecting the knees and/or lower legs of an occupant during a collision event. Such knee airbag arrangements generally include an inflatable knee airbag for absorbing at least a portion of the impact energy otherwise directed to an occupant's knees and lower legs during a collision event, especially by restraining the occupant by limiting forward movement of the knees and lower legs.

One suitable knee airbag arrangement is shown and described is commonly assigned U.S. Pat. No. 9,592,787 (the '787 patent). The '787 patent discloses a knee airbag arrangement having an inflatable cushion configured and arranged to rapidly deploy between the knees of a passenger and an instrument panel of the vehicle. The inflatable cushion of the knee airbag arrangement includes a front panel, a rear panel coupled to the front panel, and a hinge portion having a thin inflation section at a position corresponding to a housing connecting portion. The inflatable cushion is connected to a housing connection portion at the hinge portion upon inflation. The '787 patent is incorporated by reference as if fully set forth herein.

Another suitable air knee airbag arrangement is shown and described is commonly assigned U.S. Ser. No. 18/107,332, filed Feb. 8, 2023 (the '332 application). The '332 application discloses a knee airbag arrangement having a front panel, rear panel coupled to the front panel to define an inflation chamber, and an intermediate panel between the front panel and the rear panel and within the inflation chamber. The intermediate panel is connected to the front panel and the rear panel at various locations between a proximal end and a distal end of the intermediate panel to control an inflated configuration of the knee airbag. First and second suspension portions suspend the proximal end of the intermediate panel between the front panel and the rear panel and permeable to the passage of inflation gases. The first suspension portion extends between the front panel and the proximal end of the intermediate panel. The second suspension portion extends between the rear panel and the proximal end of the intermediate panel. An inflator for inflating the knee airbag is disposed in the inflation chamber at a proximal end of the knee airbag. An inflation gas diffusing arrangement is disposed in the inflation chamber between the inflator and the proximal end of the intermediate panel.

While known occupant restraint systems including a knee airbag arrangement such as the knee airbag arrangement shown and described in the '787 patent and the '332 application have proven to be suitable for their intended uses, a continuous need for improvement in the relevant art remains.

SUMMARY

This section provides a general summary of the disclosure, and is not a comprehensive disclosure of its full scope or all of its features.

In accordance with one particular aspect, the present teachings provide a knee airbag including a front panel, a rear panel and an intermediate panel. The rear panel is coupled to the front panel to define an inflation chamber. The intermediate panel is disposed between the front panel and the rear panel and within the inflation chamber. The intermediate panel is connected to the rear panel by rows of first attachment points extending in a lateral direction across the knee airbag and connected to the front panel by rows of second attachment points extending in the lateral direction. The airbag includes a proximal bending area proximate a proximal end thereof. Within the proximal bending area, longitudinal distances between adjacent rows of first and second attachment locations are greater than longitudinal distances between adjacent rows of second attachment locations.

In accordance with another particular aspect, the present teachings provide a knee airbag including a front panel, a rear panel and an intermediate panel. The rear panel is coupled to the front panel to define an inflation chamber. The intermediate panel is disposed between the front panel and the rear panel and within the inflation chamber. The intermediate panel is connected to the rear panel by rows of first attachment points extending in a lateral direction across the knee airbag and connected to the front panel by rows of second attachment points extending in the lateral direction. The airbag includes a proximal bending area proximate a proximal end thereof, The airbag includes an open width along a line passing through a proximal most row of first attachments locations of the proximal bending area that is greater than a closed width along the line. In accordance with another particular aspect, the present teachings provide a knee airbag including a front panel, a rear panel and an intermediate panel. The rear panel is coupled to the front panel to define an inflation chamber. The intermediate panel is disposed between the front panel and the rear panel and within the inflation chamber. The intermediate panel is connected to the rear panel by rows of first attachment points extending in a lateral direction across the knee airbag and connected to the front panel by rows of second attachment points extending in the lateral direction. The airbag includes a proximal bending area proximate a proximal end thereof. The airbag at the proximal bending area has a side flow opening width along a line passing through a proximal most row of first attachments locations that is greater than 33 percent of the total width along the line. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, not all possible implementations, and are not intended to limit the scope of the present disclosure.

DETAILED DESCRIPTION

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance and does not necessarily mean special or preferred.

In the following description, directional terms such as upper direction, lower direction, forward direction, rearward direction, and the like will be defined based on a knee airbag in a state that an associated airbag housing is coupled to a lower portion of an instrument panel. That is, a direction toward the roof of a vehicle is defined as an upper direction (U), a direction toward the bottom of the vehicle is defined as a lower direction (L), a direction toward a passenger is defined as a rearward direction (R), and a direction toward a front of the vehicle is defined as a forward direction (F). The terms distal and proximal used to describe the knee airbag or elements thereof shall be understood to be with reference to a deployed orientation of the knee airbag. Explaining further, the term distal refers to being at or toward the end of the knee airbag at the housing and the term proximal refers to being at or toward the end of the knee airbag opposite the housing.

Figure 1:
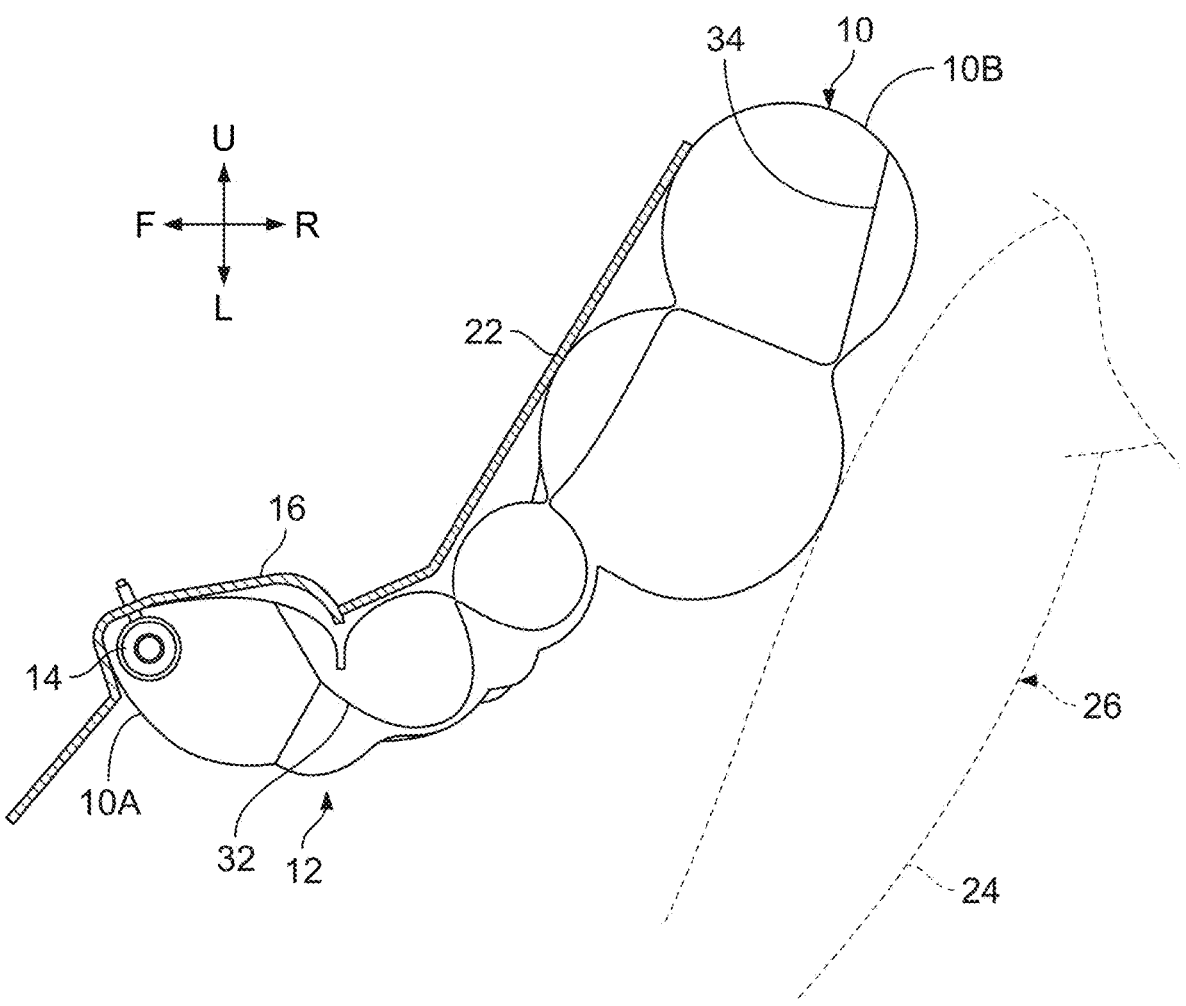
FIG. 1 is a side view of a knee airbag for a vehicle in accordance with the present teachings, the knee airbag shown inflated and operatively disposed between the knees of a passenger and an instrument panel of the vehicle.
Figure 2:
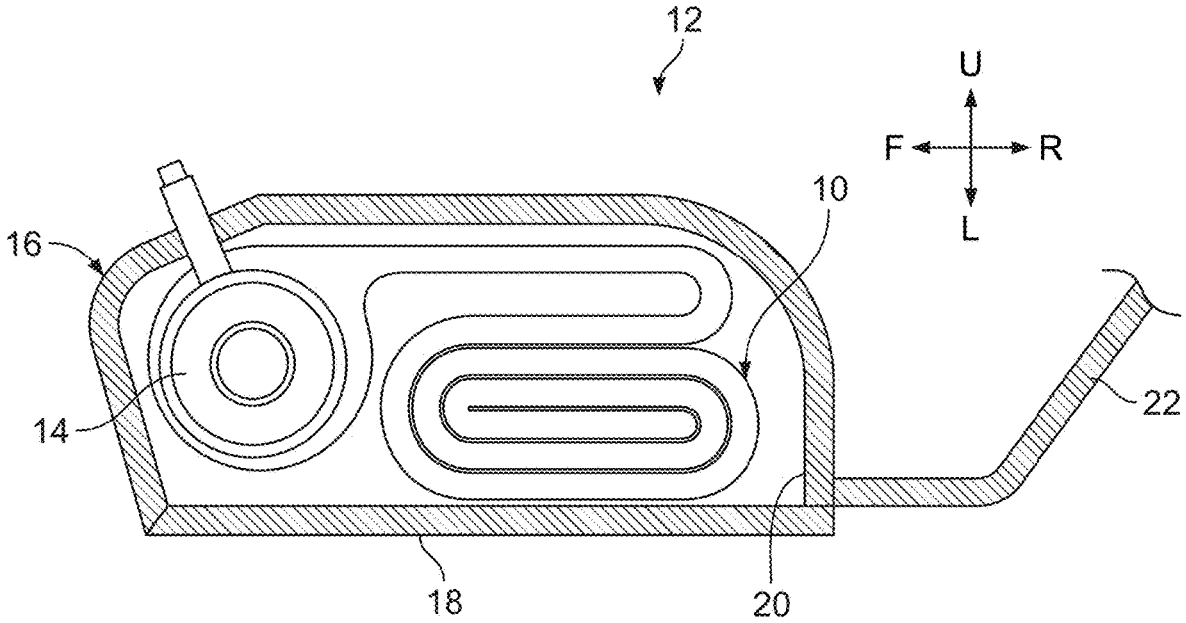
FIG. 2 is longitudinal cross-sectional view of the knee airbag of FIG. 1, the knee airbag shown prior to deployment within an airbag housing, and operatively associated with an inflator.

With particular reference to the environmental views of FIGS. 1 and 2, a knee airbag for a vehicle in accordance with the present teachings is illustrated and generally identified at reference character 10. The knee airbag 10, which is intended to be a generic representation of the various specific embodiments that will be described below, is shown incorporated into a knee airbag arrangement 12. The knee airbag arrangement 12 further includes an inflator 14 for supplying inflation gases to the knee airbag 10 upon sensing of predetermined collision events, and an airbag housing 16 receiving the knee airbag 10 and the inflator 14. The airbag housing 16 includes a door 18 normally covering an opening 20 of the airbag housing 16. The knee airbag arrangement 12 is installed within the vehicle at a lower portion of an instrument panel 22. Upon deployment, the knee airbag 10 is operatively disposed in a longitudinal direction (e.g., in a F to R direction) between the knees 24 of a passenger 26 and the instrument panel 22 of the vehicle.

Figure 3:
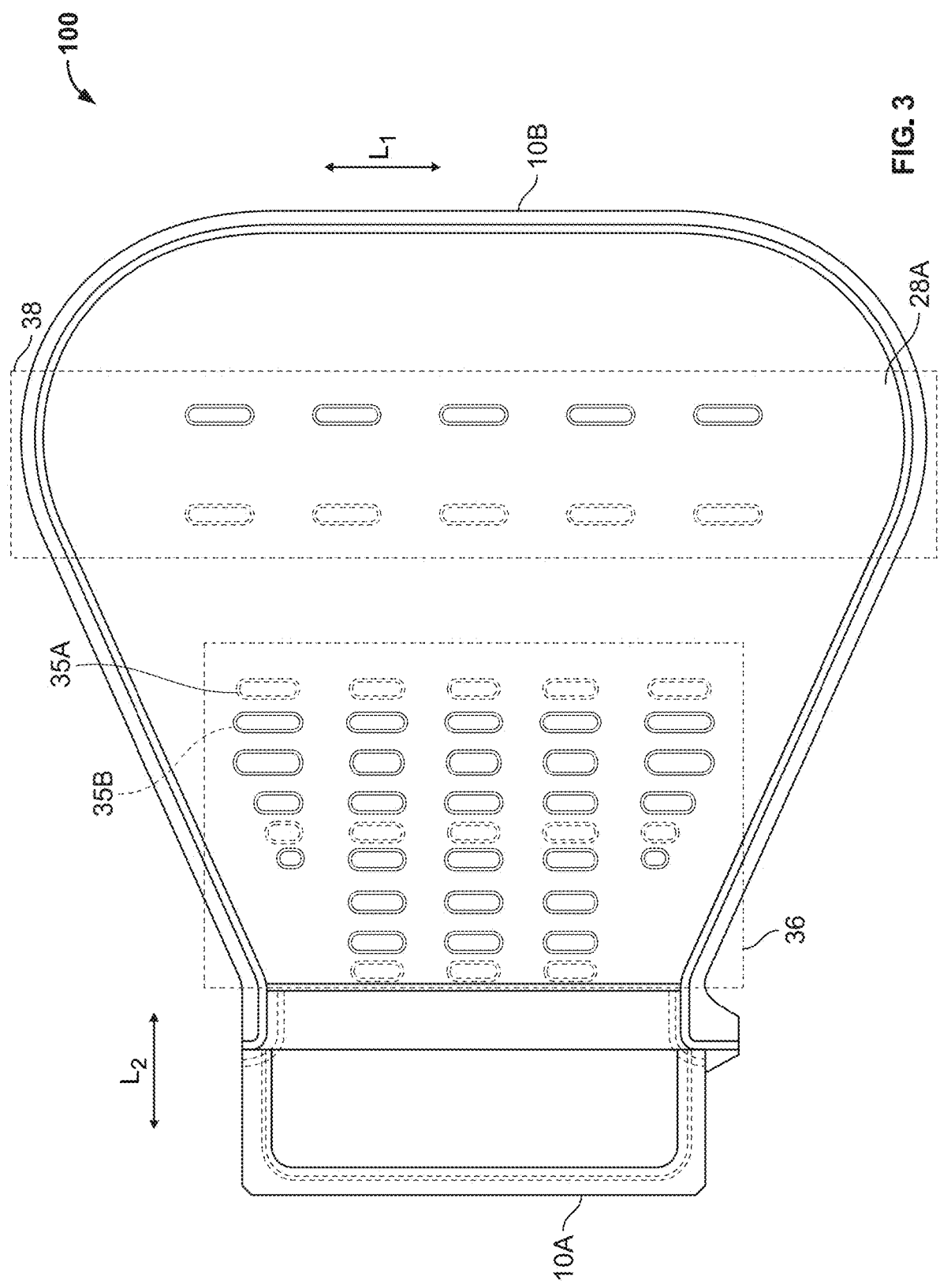
FIG. 3 is a front view of a first knee airbag constructed in accordance with the present teachings.
Figure 4:
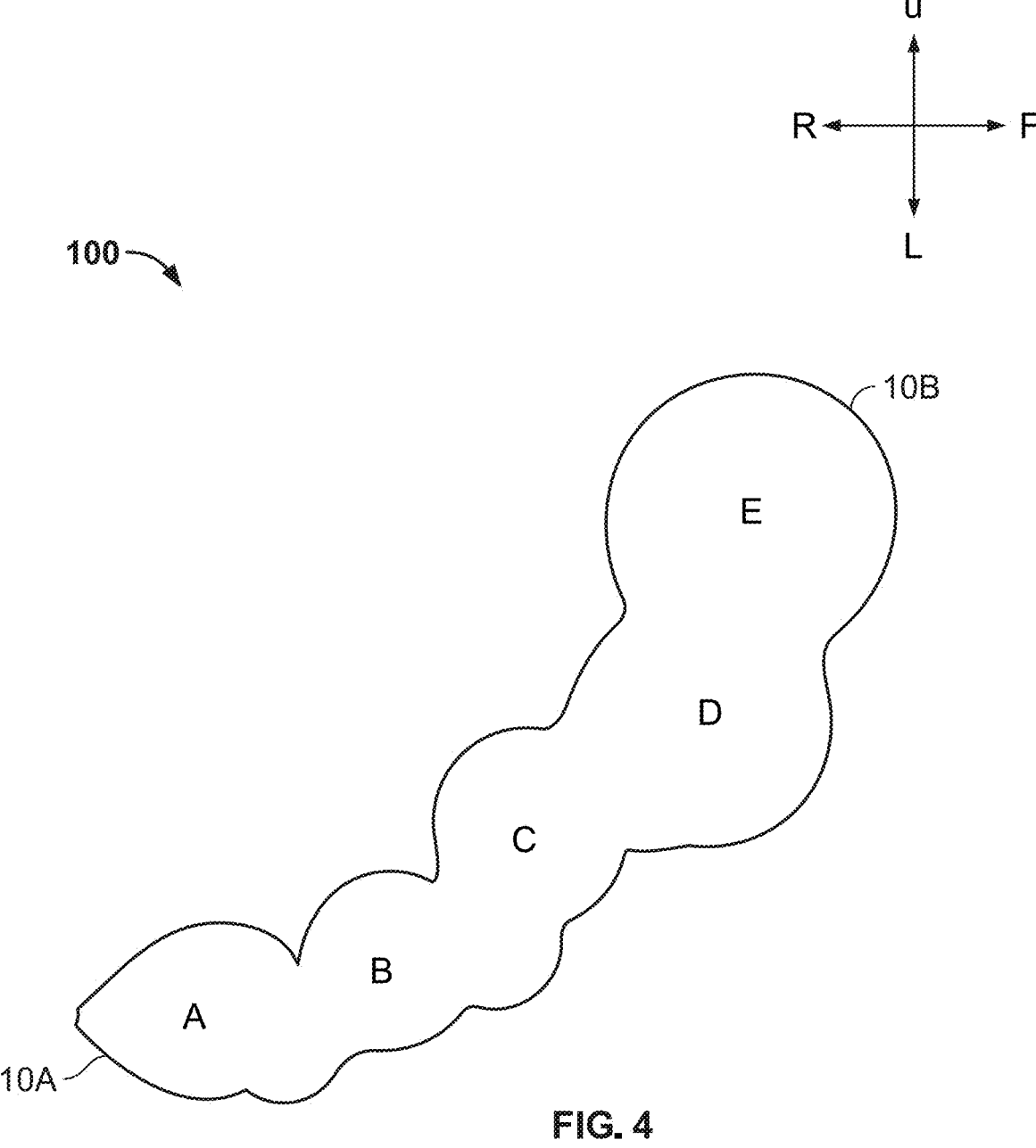
FIG. 4 is a simplified side view of the knee airbag of FIG. 3.
Figure 5:
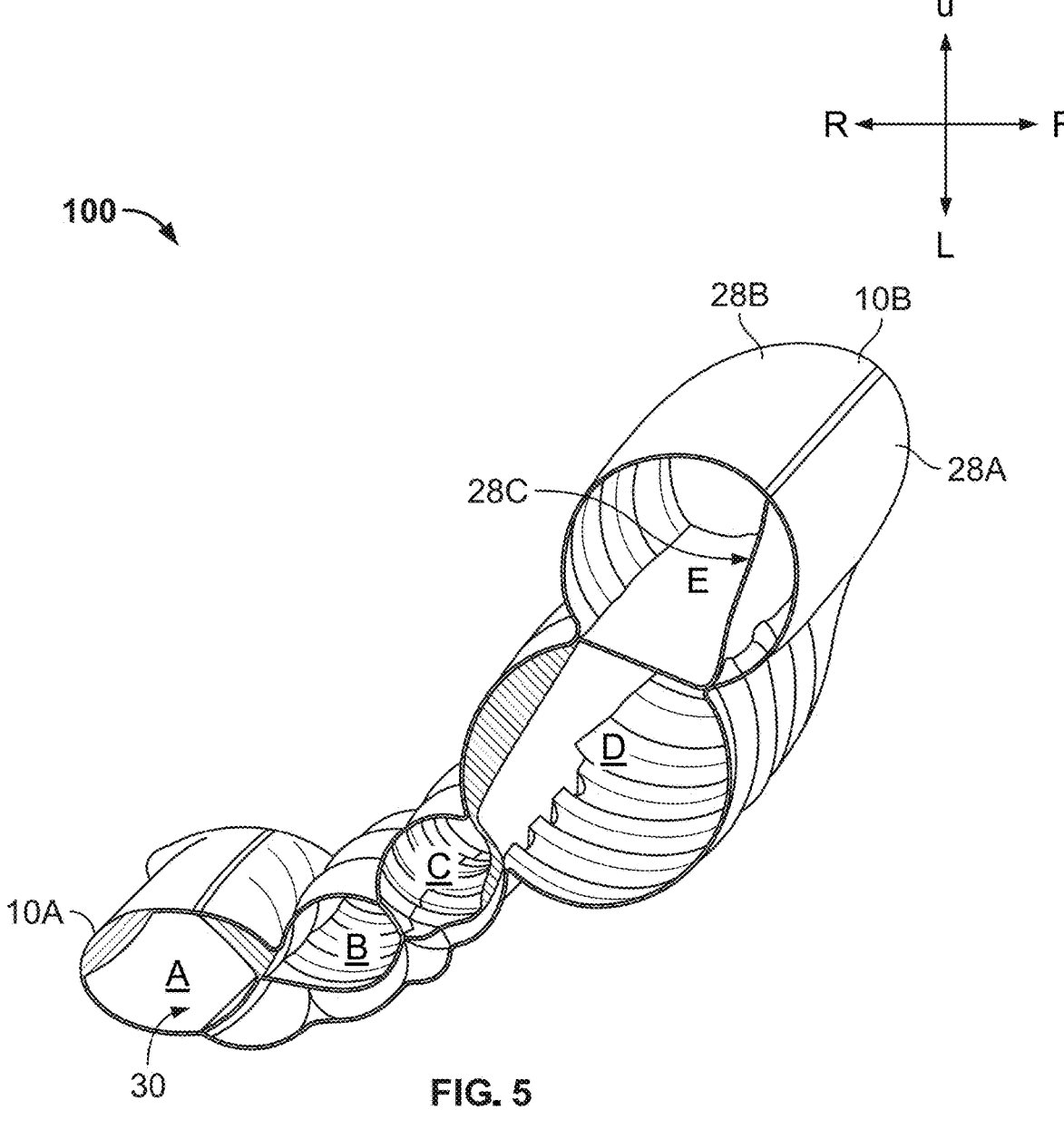
FIG. 5 is a longitudinal cross-sectional view of the knee airbag of FIG. 3.

With continued reference to the environmental views of FIGS. 1 and 2 and additional reference to FIGS. 3 through 5, the details of a first knee airbag 100 constructed in accordance with the present teachings will be further described. The knee airbag 100 extends between a proximal end 10A and a distal end 10B and is shown to generally include a first panel 28A, a second panel 28B and a third panel 28C. In the embodiment illustrated, the first panel is a front panel 28A, the second panel is a rear panel 28B, and the third panel is an intermediate panel 28C. As will become more clear below, the intermediate panel 28C cooperates with front and rear panels 28A and 28B to define a desired deployment shape of the knee airbag 100. As shown in the simplified cross-sectional view of FIG. 5, the intermediate panel 28C is disposed in the inflation chamber 30, extends at least substantially across the inflation chamber 30 in an airbag lateral direction, and at various locations between a proximal end 32 and a distal end 34 of the intermediate panel 28C is attached to both the front panel 28A and the rear panel 28B.

When the front and rear panels 28A and 28B are internally connected with the intermediate panel 28C, a predetermined deployment profile or shape is defined. It will be understood that the particular deployment profile shown in the drawings and the corresponding attachment locations between the intermediate panel 28C and the front panel 28A, and the corresponding attachment locations between the intermediate panel 28C and the rear panel 28B may be modified or otherwise adapted within the scope of the present teachings. The particular attachment locations between the panels 28A-28C and the length difference between the upper panel 28A and the lower panel 28B cooperate to define an airbag shape that unfolds and deploys between the knees 24 of the passenger 26 and the instrument panel 22 of the vehicle to protect the passenger 26.

As shown particularly in FIGS. 3 through 5 of the drawings, the attachment locations between the panels 28A-28C include first attachment locations 35A that connect the rear panel 28B and the intermediate panel 28C, and includes second attachment locations 35B that connect the front panel 28A and the intermediate panel 28C. The first attachment locations 35A (shown in dashed lines in FIG. 3, for example) and the second attachment locations 35B (shown in solid lines FIG. 3, for example) are arranged in rows of first attachment locations 35A and rows of second attachment locations 35B, respectively, extending in a lateral direction $L_1$ laterally across the airbag 100. The rows of first attachment locations 35A and rows of second attachment locations 35B are spaced apart from one another in a longitudinal direction $L_2$ of the airbag 100.

The rows of the first and second attachment locations 35A and 35B cooperate to define a proximal or lower bending area 36 of the airbag 100 and a distal or upper bending area 38 of the airbag 100. The proximal bending area 36 facilitates bending of the airbag closer to the proximal end 10A of the airbag 100 and the distal bending area 38 facilitates bending of the airbag 100 closer to the distal end 10B of the airbag 100.

Inflation gases from the inflator 14 pass between laterally adjacent attachment locations 35A and 35B and laterally between attachment locations 35A and 35B and an adjacent portion of a peripheral seam 40 (i.e., side flow openings of the airbag 100). In the airbag 100 of FIGS. 3-5 and the other embodiments detailed below, the attachment locations 35A and 35B contribute to an arrangement that provides a desired deployment trajectory and a desired inflation profile. The attachment location 35A and 35B also contribute to an arrangement that effectively diffuses inflation gases for fast and full inflation of the airbag 100.

In the embodiment illustrated, the rows of attachment locations 35A and 35B are arranged to define five inflatable chambers A-E (as identified in the simplified side view of the airbag 100 of FIG. 4, for example). The relative size of these inflatable chambers A-E may be modified through alternate longitudinal spacings between adjacent rows of attachment locations 35A and 35B. A degree of bending between adjacent inflatable chambers A-E may be also modified by alternate longitudinal spacings between adjacent rows of attachment locations 35A and 35B.

In the embodiment illustrated, the proximal bending area 36 of the airbag 100 includes 3 rows of first attachment locations 35A and 6 rows of second attachment locations 35B. The proximal most row is a first row of first attachment locations 35A. In a proximal to distal direction of the airbag 100, the proximal bending area 36 next includes first, second and third rows of second attachment locations 35B, a second row of first attachment locations 35A, fourth, fifth and sixth rows of second attachment locations 35B, and a third row of first attachment locations 35A.

In one particular application, the first row of first attachment locations 35A is longitudinal spaced from the first row of second attachment locations 35B by a distance of 21 mm. It will be understood that all dimensions between adjacent rows of attachment locations 35A/35B in this embodiment and the embodiment that follow are center-to-center dimensions of the attachment points 35A/35B. The longitudinal distance between the first row of second attachment locations 35B and the second row of second attachment locations 35B is 30 mm and the longitudinal distance between the second row of second attachment locations 35B and the third row of second attachment locations 35B is 30 mm. The longitudinal distance between the third row of second attachment locations 35B and the second row of first attachment locations is 40 mm. The longitudinal distance between the second row of first attachment locations 35A and the fourth row of second attachment locations 35B is 40 mm. The longitudinal distance between the fourth row of second attachment locations 35B and the fifth row of second attachment locations 35B is 30 mm and the longitudinal distance between the fifth row of second attachment locations 35B and the sixth row of second attachment locations 35B is 30 mm. The longitudinal distance between the sixth row of second attachment locations 35B and the third row of first attachment locations is 40 mm.

In the embodiment illustrated, the distal bending area 38 of the airbag 100 includes a fourth row of first attachment locations 35A and seventh row of second attachment locations 35B. The fourth row of first attachment locations 35A of the proximal bending area 36 is longitudinally spaced from the third row of first attachment locations 35 of the proximal bending area by a distance of 66 mm. The fourth row of first attachment locations 35A is longitudinally spaced from the seventh row of second attachment locations 35B by a distance of 70 mm. The seventh row of second attachment locations 35B is longitudinally spaced from the peripheral seam at the distal end of the airbag 100 by a distance of 131 mm.

Figure 6:
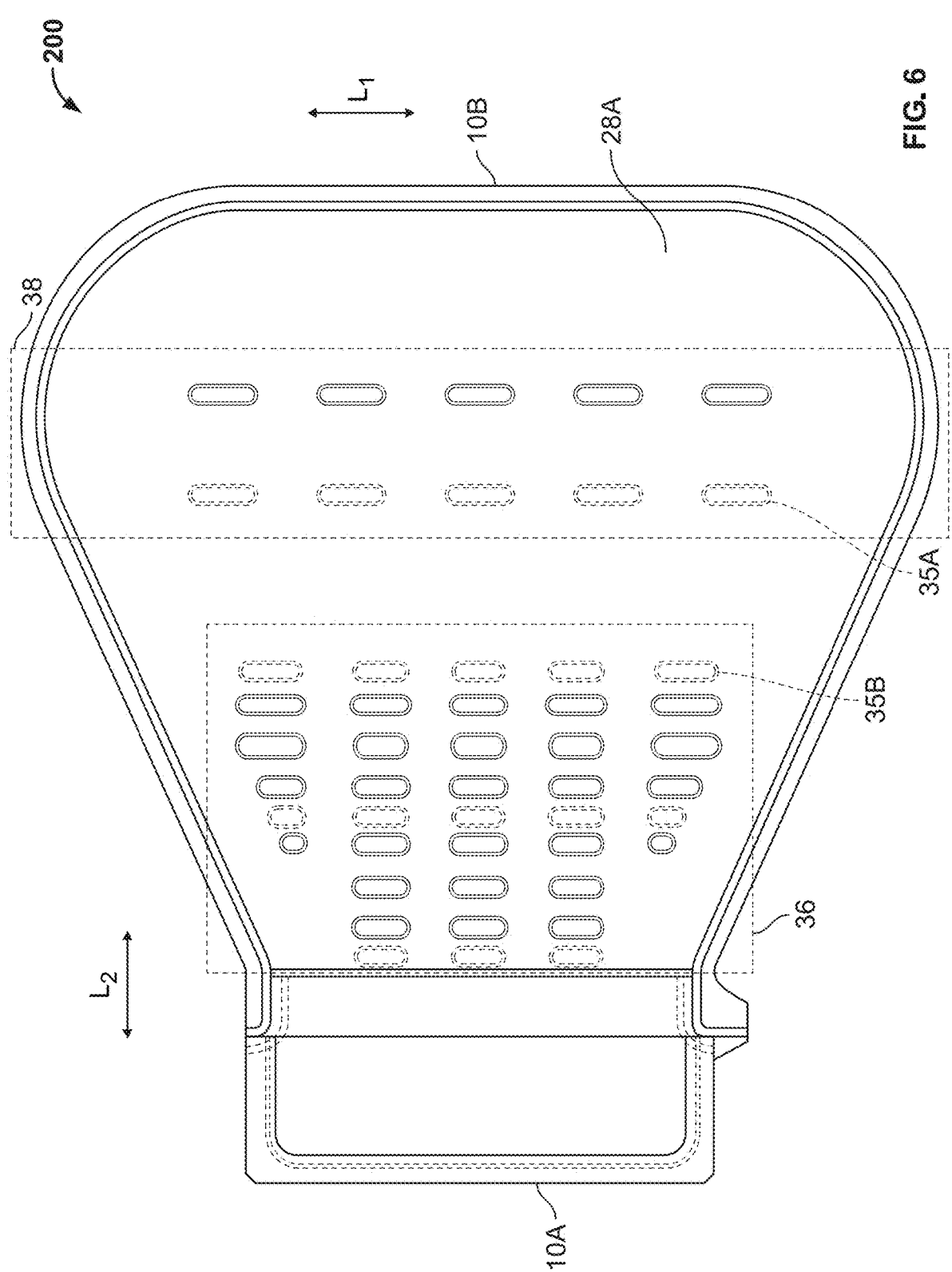
FIG. 6 is a front view of a second knee airbag constructed in accordance with the present teachings.
Figure 7:
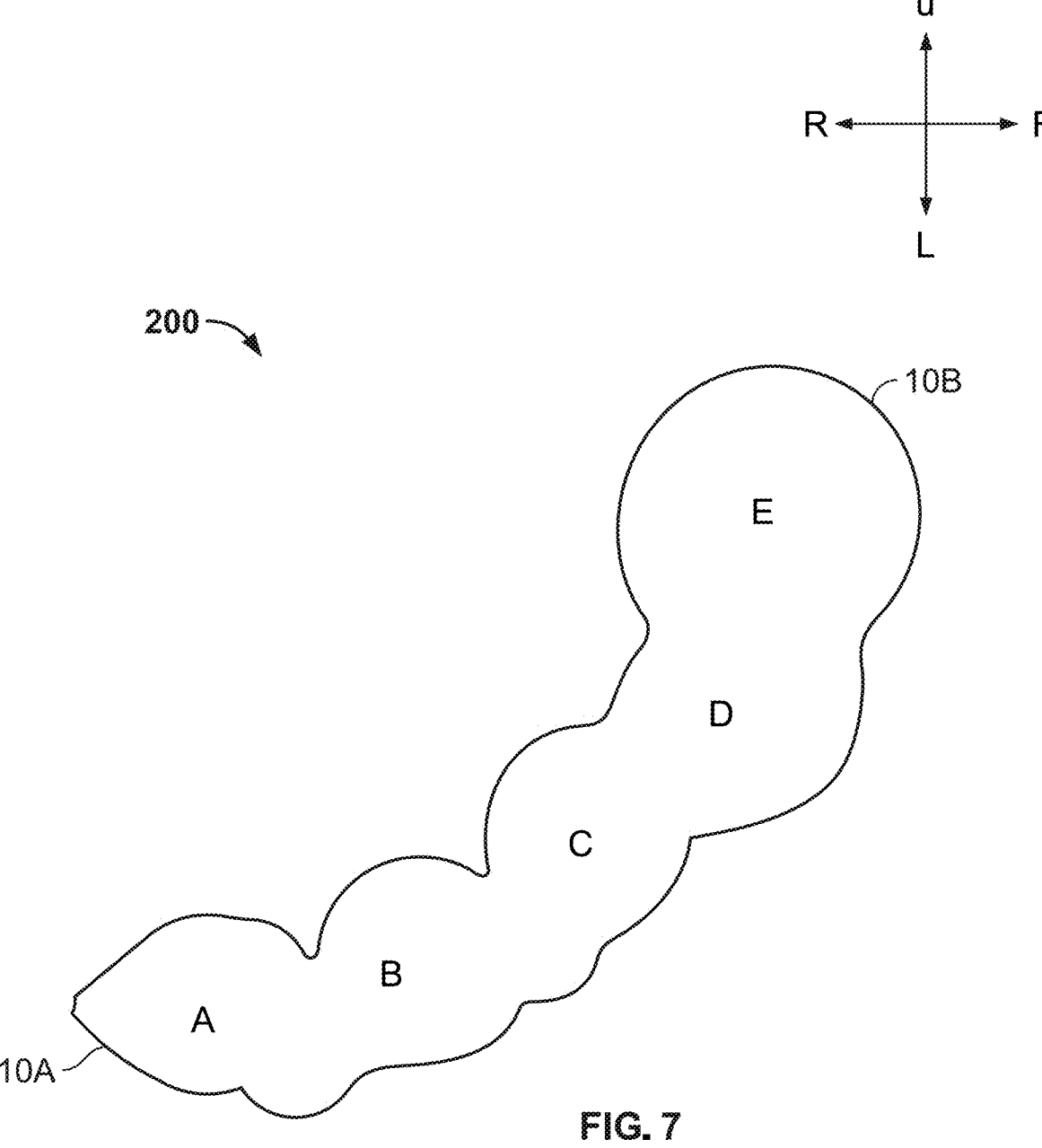
FIG. 7 is a longitudinal cross-sectional view of the knee airbag of FIG. 6.

Turning to FIGS. 6 and 7, a second exemplary airbag constructed in accordance with the present teaching is shown and identified at reference character 200. Like reference characters have been used to identify like features between the airbag 100 and the airbag 200. The airbag 200 differs from the airbag 100 primarily by different spacings between the adjacent rows of the first and second attachment points 35A and 35B. It will be understood that the features of the airbag 200 are similar to the features of the airbag 100 to the extent not otherwise described.

As above, the rows of attachment locations 35A and 35B are arranged to define five inflatable chambers A-E and are arranged to define a proximal bending area 36 including three rows of first attachment locations 35A and six rows of second attachment locations, and to define a distal bending area 38 including a one row of first attachment locations 35A and a one row of second attachment locations 35B. Again, the relative size of the inflatable chambers A-E and the bending between inflatable chambers A-E be modified through alternate longitudinal spacings between adjacent rows of attachment locations 35A and 35B.

Beginning with the proximal bending area 36, the proximal most row is a first row of first attachment locations 35A. In a proximal to distal direction of the airbag 200, the proximal bending area 36 next includes first, second and third rows of second attachment locations 35B, a second row of first attachment locations 35A, fourth, fifth and sixth rows of second attachment locations 35B, and a third row of first attachment locations 35A.

In one particular application, the first row of first attachment locations 35A is longitudinal spaced from the first row of second attachment locations 35B by a distance of 30 mm. The longitudinal distance between the first row of second attachment locations 35B and the second row of second attachment locations 35B is 40 mm and the longitudinal distance between the second row of second attachment locations 35B and the third row of second attachment locations 35B is 40 mm. The longitudinal distance between the third row of second attachment locations 35B and the second row of first attachment locations 35A is 30 mm. The longitudinal distance between the second row of first attachment locations 35A and the fourth row of second attachment locations 35B is 30 mm. The longitudinal distance between the fourth row of second attachment locations 35B and the fifth row of second attachment locations 35B is 40 mm and the longitudinal distance between the fifth row of second attachment locations 35B and the sixth row of second attachment locations 35B is 40 mm. The longitudinal distance between the sixth row of second attachment locations 35B and the third row of first attachment locations is 30 mm. Thus, the longitudinal distances between adjacent rows of first and second attachment locations 35A and 35B is less than the longitudinal distances between adjacent rows of second attachment locations 35B within the proximal bending area 36.

In the embodiment illustrated, the distal bending area 38 of the airbag 200 includes a fourth row of first attachment locations 35A and seventh row of second attachment locations 35B. The fourth row of first attachment locations 35A of the distal bending area is longitudinally spaced from the third row of first attachment locations 35 of the proximal bending area by a distance of 46 mm. The fourth row of first attachment locations 35A is longitudinally spaced from the seventh row of second attachment locations 35B by a distance of 70 mm. The seventh row of second attachment locations 35B is longitudinally spaced from the peripheral seam at the distal end of the airbag 100 by a distance of 131 mm.

Figure 8:
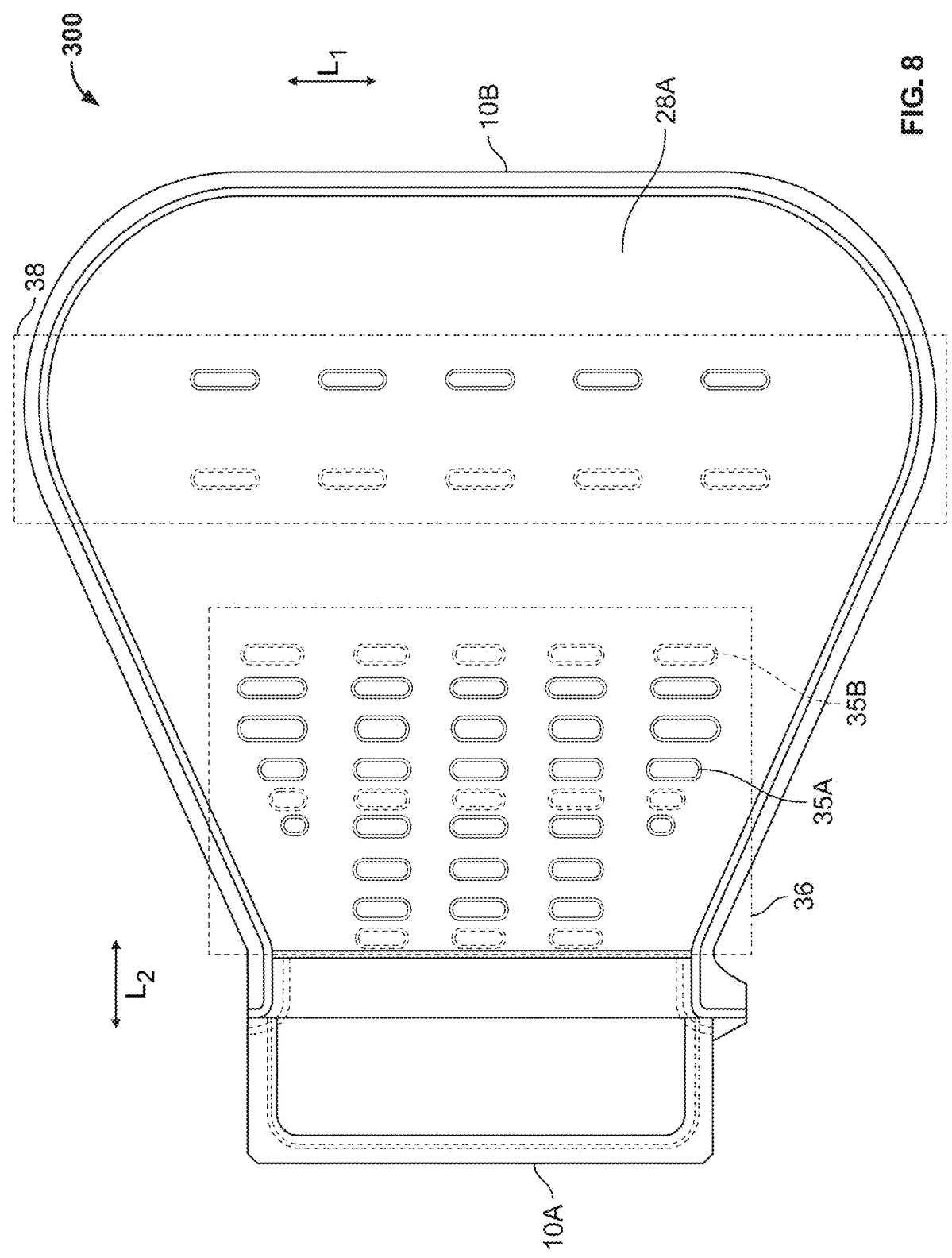
FIG. 8 is a front view of a third knee airbag constructed in accordance with the present teachings.
Figure 9:
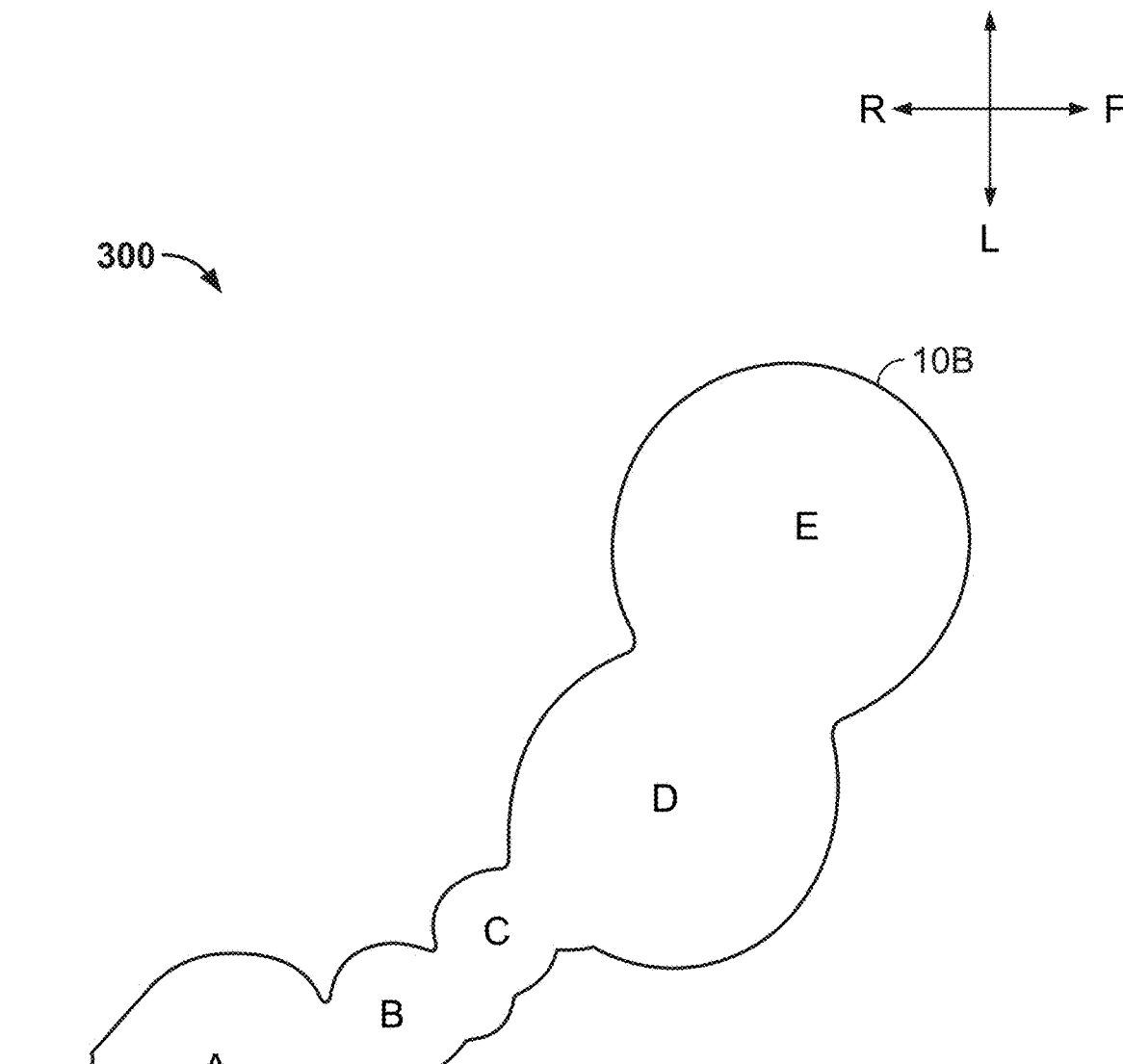
FIG. 9 is a longitudinal cross-sectional view of the knee airbag of FIG. 8.

Turning to FIGS. 8 and 9, a third exemplary airbag constructed in accordance with the present teaching is shown and identified at reference character 300. Like reference characters have been used to identify like features between the airbag 100 and the airbag 300. The airbag 300 again differs from the airbag 100 primarily by different spacings between the adjacent rows of the first and second attachment points 35A and 35B. It will be understood that the features of the airbag 300 are similar to the features of the airbag 100 to the extent not otherwise described.

As above, the rows of attachment locations 35A and 35B are arranged to define five inflatable chambers A-E and are arranged to define a proximal bending area 36 including three rows of first attachment locations 35A and six rows of second attachment locations, and to define a distal bending area 38 including a one row of first attachment locations 35A and a one row of second attachment locations 35B. Again, the relative size of the inflatable chambers A-E and the bending between inflatable chambers A-E be modified through alternate longitudinal spacings between adjacent rows of attachment locations 35A and 35B.

Beginning with the proximal bending area 36, the proximal most row is a first row of first attachment locations 35A. In a proximal to distal direction of the airbag 300, the proximal bending area 36 next includes first, second and third rows of second attachment locations 35B, a second row of first attachment locations 35A, fourth, fifth and sixth rows of second attachment locations 35B, and a third row of first attachment locations 35A.

In one particular application, the first row of first attachment locations 35A is longitudinal spaced from the first row of second attachment locations 35B by a distance of 21 mm. The longitudinal distance between the first row of second attachment locations 35B and the second row of second attachment locations 35B is 30 mm and the longitudinal distance between the second row of second attachment locations 35B and the third row of second attachment locations 35B is 20 mm. The longitudinal distance between the third row of second attachment locations 35B and the second row of first attachment locations 35A is 20 mm. The longitudinal distance between the second row of first attachment locations 35A and the fourth row of second attachment locations 35B is 20 mm. The longitudinal distance between the fourth row of second attachment locations 35B and the fifth row of second attachment locations 35B is 30 mm and the longitudinal distance between the fifth row of second attachment locations 35B and the sixth row of second attachment locations 35B is 20 mm. The longitudinal distance between the sixth row of second attachment locations 35B and the third row of first attachment locations is 20 mm.

In the embodiment illustrated, the distal bending area 37 of the airbag 300 includes a fourth row of first attachment locations 35A and seventh row of second attachment locations 35B. The fourth row of first attachment locations 35A of the distal bending area is longitudinally spaced from the third row of first attachment locations 35 of the proximal bending area by a distance of 126 mm. The fourth row of first attachment locations 35A is longitudinally spaced from the seventh row of second attachment locations 35B by a distance of 70 mm. The seventh row of second attachment locations 35B is longitudinally spaced from the peripheral seam at the distal end of the airbag 100 by a distance of 171 mm.

Figure 10:
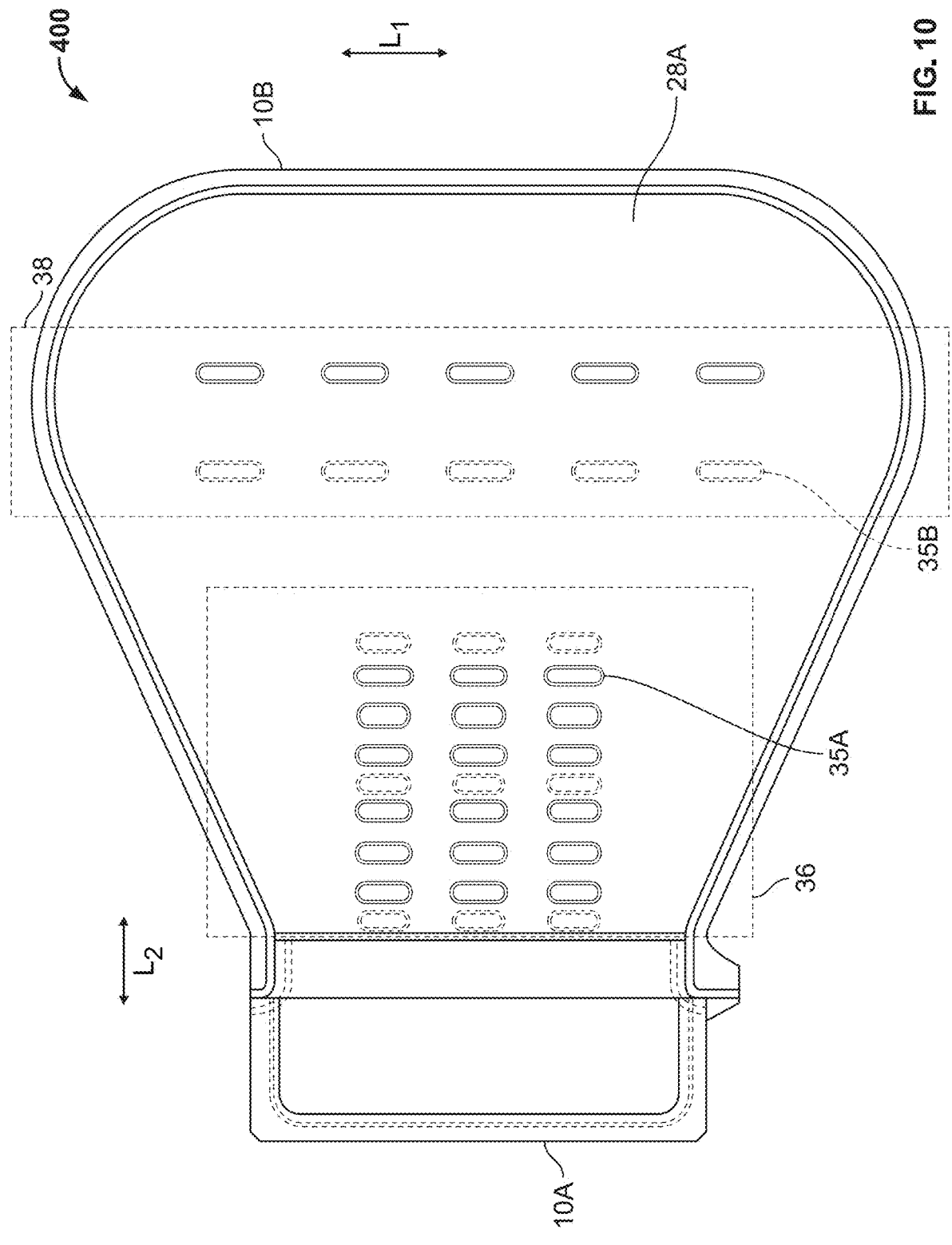
FIG. 10 is a front view of a fourth knee airbag constructed in accordance with the present teachings.
Figure 11:
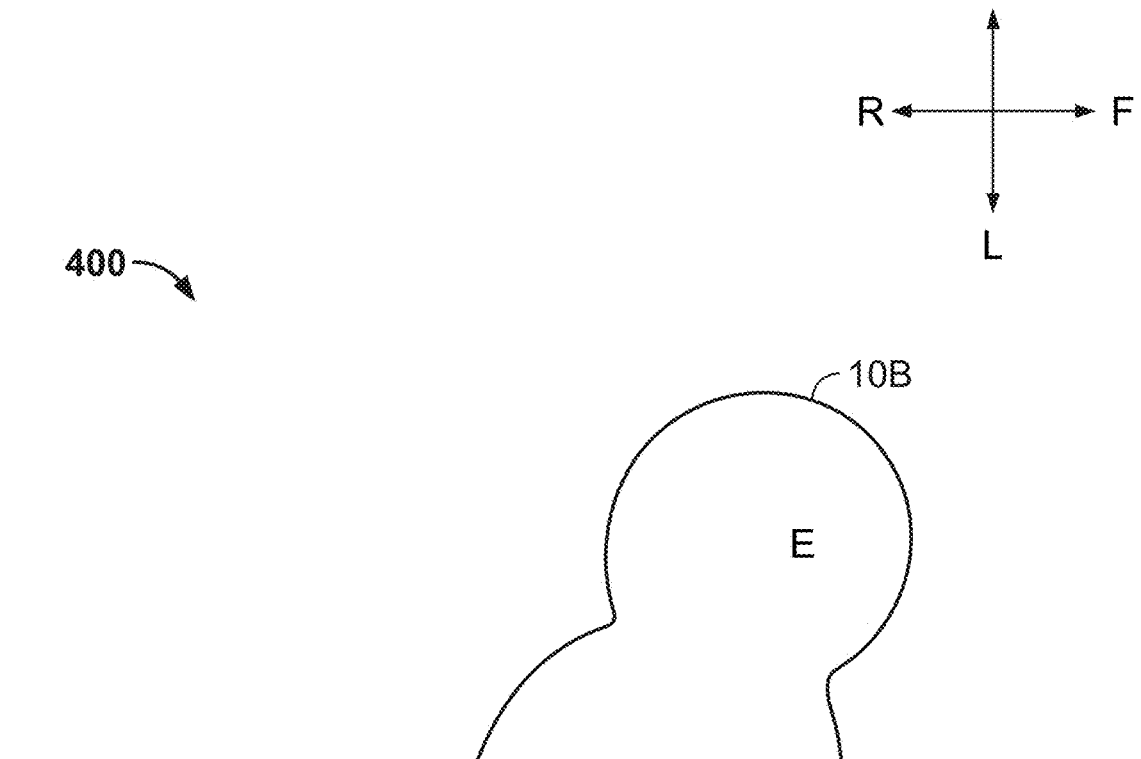
FIG. 11 is a longitudinal cross-sectional view of the knee airbag of FIG. 10.

Turning to FIGS. 10 and 11, a fourth exemplary airbag constructed in accordance with the present teaching is shown and identified at reference character 400. Like reference characters have been used to identify like features between the airbag 100 and the airbag 400. The airbag 300 again differs from the airbag 100 primarily by different spacings between the adjacent rows of the first and second attachment points 35A and 35B. Additionally, the laterally most attachment points 35A and 35B from some of the rows of first and second attachment points 35A and 35B have been eliminated. It will be understood that the features of the airbag 400 are similar to the features of the airbag 100 to the extent not otherwise described.

As above, the rows of attachment locations 35A and 35B are arranged to define five inflatable chambers A-E and are arranged to define a proximal bending area 36 including three rows of first attachment locations 35A and six rows of second attachment locations, and to define a distal bending area 38 including a one row of first attachment locations 35A and a one row of second attachment locations 35B. Again, the relative size of the inflatable chambers A-E and the bending between inflatable chambers A-E be modified through alternate longitudinal spacings between adjacent rows of attachment locations 35A and 35B.

Beginning with the proximal bending area 36, the proximal most row is a first row of first attachment locations 35A. In a proximal to distal direction of the airbag 400, the proximal bending area 36 next includes first, second and third rows of second attachment locations 35B, a second row of first attachment locations 35A, fourth, fifth and sixth rows of second attachment locations 35B, and a third row of first attachment locations 35A.

In one particular application, the first row of first attachment locations 35A is longitudinal spaced from the first row of second attachment locations 35B by a distance of 21 mm. The longitudinal distance between the first row of second attachment locations 35B and the second row of second attachment locations 35B is 30 mm and the longitudinal distance between the second row of second attachment locations 35B and the third row of second attachment locations 35B is 30 mm. The longitudinal distance between the third row of second attachment locations 35B and the second row of first attachment locations 35A is 21 mm. The longitudinal distance between the second row of first attachment locations 35A and the fourth row of second attachment locations 35B is 21 mm. The longitudinal distance between the fourth row of second attachment locations 35B and the fifth row of second attachment locations 35B is 30 mm and the longitudinal distance between the fifth row of second attachment locations 35B and the sixth row of second attachment locations 35B is 30 mm. The longitudinal distance between the sixth row of second attachment locations 35B and the third row of first attachment locations is 21 mm. Thus, the longitudinal distances between adjacent rows of first and second attachment locations 35A and 35B is less than the longitudinal distances between adjacent rows of second attachment locations 35B within the proximal bending area 36.

In the embodiment illustrated, the distal bending area 37 of the airbag 400 includes a fourth row of first attachment locations 35A and seventh row of second attachment locations 35B. The fourth row of first attachment locations 35A of the distal bending area is longitudinally spaced from the third row of first attachment locations 35 of the proximal bending area by a distance of 126 mm. The fourth row of first attachment locations 35A is longitudinally spaced from the seventh row of second attachment locations 35B by a distance of 70 mm. The seventh row of second attachment locations 35B is longitudinally spaced from the peripheral seam 40 at the distal end of the airbag 100 by a distance of 171 mm.

Figure 12:
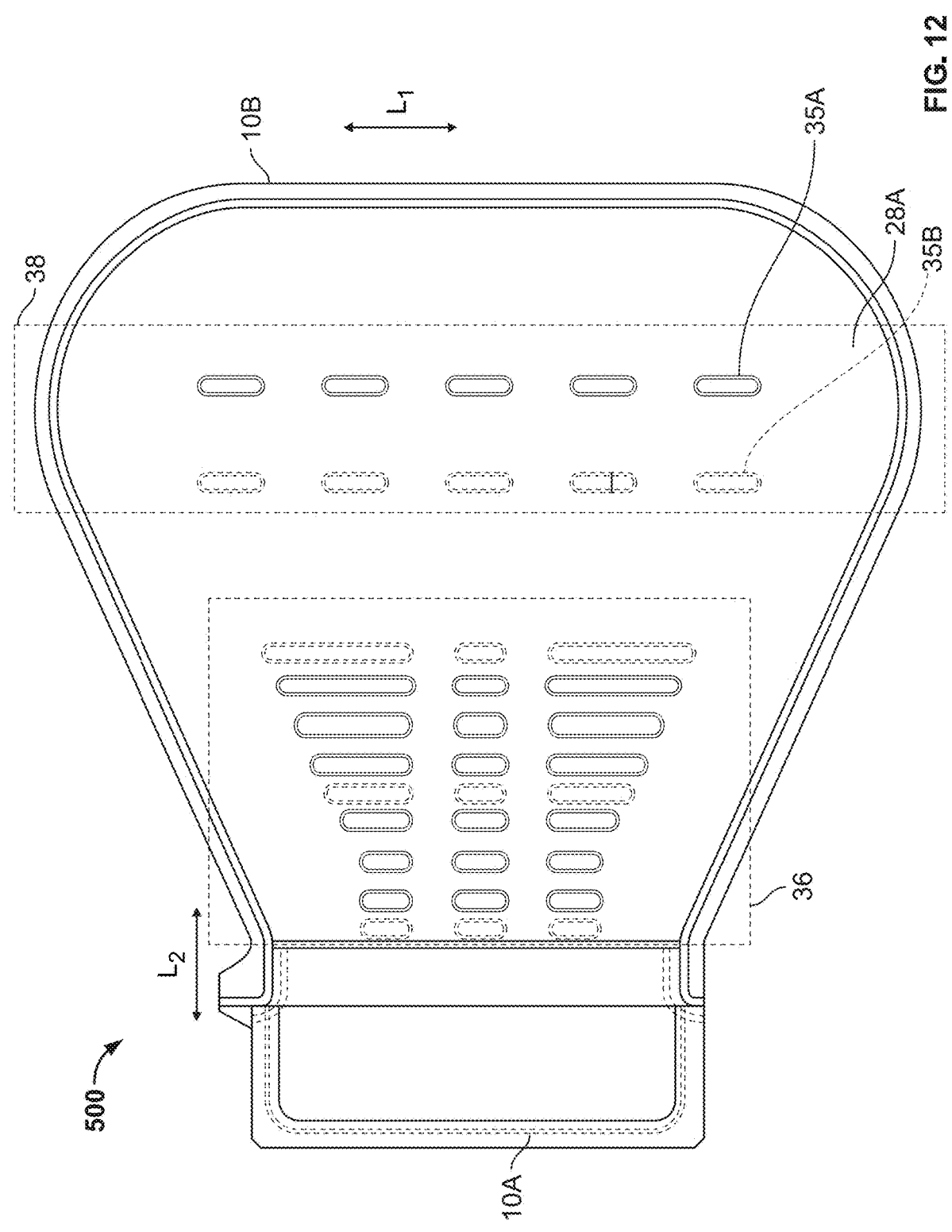
FIG. 12 is a front view of a fifth knee airbag constructed in accordance with the present teachings.

Turning to FIG. 12, a fifth exemplary airbag constructed in accordance with the present teaching is shown and identified at reference character 500. Like reference characters have been used to identify like features between the airbag 100 and the airbag 500. The airbag 500 again differs from the airbag 100 primarily by different spacings between the adjacent rows of the first and second attachment points 35A and 35B. Additionally, the lateral most attachment points 35A and 35B from some of the rows of first and second attachment points 35A and 35B have been eliminated further elongated. It will be understood that the features of the airbag 500 are similar to the features of the airbag 100 to the extenT not otherwise described.

As above, the rows of attachment locations 35A and 35B are arranged to define five inflatable chambers A-E and are arranged to define a proximal bending area 36 including three rows of first attachment locations 35A and six rows of second attachment locations, and to define a distal bending area 38 including a one row of first attachment locations 35A and a one row of second attachment locations 35B. Again, the relative size of the inflatable chambers A-E and the bending between inflatable chambers A-E be modified through alternate longitudinal spacings between adjacent rows of attachment locations 35A and 35B.

Beginning with the proximal bending area 36, the proximal most row is a first row of first attachment locations 35A. In a proximal to distal direction of the airbag 500, the proximal bending area 36 next includes first, second and third rows of second attachment locations 35B, a second row of first attachment locations 35A, fourth, fifth and sixth rows of second attachment locations 35B, and a third row of first attachment locations 35A.

Within the proximal bending area 36, the longitudinal distances between adjacent rows of first and second attachment locations 35A and 35B may be greater than 30 mm and the longitudinal distances between adjacent rows of second attachment locations 35B may be less than 30 mm. More preferably, the longitudinal distances between adjacent rows of first and second attachment locations 35A and 35B may be greater than 35 mm and the longitudinal distances between adjacent rows of second attachment locations 35B may be less than 25 mm.

In one particular application, the first row of first attachment locations 35A is longitudinal spaced from the first row of second attachment locations 35B by a distance of 40 mm. The longitudinal distance between the first row of second attachment locations 35B and the second row of second attachment locations 35B is 20 mm and the longitudinal distance between the second row of second attachment locations 35B and the third row of second attachment locations 35B is 20 mm. The longitudinal distance between the third row of second attachment locations 35B and the second row of first attachment locations 35A is 40 mm. The longitudinal distance between the second row of first attachment locations 35A and the fourth row of second attachment locations 35B is 40 mm. The longitudinal distance between the fourth row of second attachment locations 35B and the fifth row of second attachment locations 35B is 20 mm and the longitudinal distance between the fifth row of second attachment locations 35B and the sixth row of second attachment locations 35B is 20 mm. The longitudinal distance between the sixth row of second attachment locations 35B and the third row of first attachment locations is 40 mm. Thus, the longitudinal distances between adjacent rows of first and second attachment locations 35A and 35B is greater than the longitudinal distances between adjacent rows of second attachment locations 35B within the proximal bending area 36.

In the embodiment illustrated, the distal bending area 37 of the airbag 500 includes a fourth row of first attachment locations 35A and seventh row of second attachment locations 35B. The fourth row of first attachment locations 35A of the distal bending area is longitudinally spaced from the third row of first attachment locations 35 of the proximal bending area by a distance of 62 mm. The fourth row of first attachment locations 35A is longitudinally spaced from the seventh row of second attachment locations 35B by a distance of 70 mm. The seventh row of second attachment locations 35B is longitudinally spaced from the peripheral seam at the distal end of the airbag 100 by a distance of 175 mm.

In each of the above embodiments, the distal bending area 36 of the airbag includes an open width along a line passing laterally through the proximal most row of attachments locations 35A that is greater than a closed width. In certain applications, the open width is at least twice as great as the closed width. Explaining further, the open width along this line extends between two points on the lateral seam of the airbag and includes the lateral spaces between the outermost attachment locations 35A and the distances between the attachment locations 35A of the proximal most row of attachments locations 35A. The closed width includes the collective length of the attachment locations 35A of the proximal most row of attachments locations 35A. Otherwise stated, the open width along the line is greater than half of the total width along the line. These relative dimension contribute to improved air flow from the proximal end 10A to the distal end 10B and provide a more robust airbag.

In one particular application, the airbag includes an open width along the line passing through a proximal most row of first attachments locations 35A of the distal bending area 36 that is 210 mm and closed width along the line that is 90 mm. In this application, the closed width includes three first attachment locations 35A that are each 30 mm, a lateral distance between the first attachment locations 35A and adjacent portions of the peripheral seam 40 is 65 mm and lateral spacing between adjacent first attachment locations 35A is 40 mm.

In at least some of the above embodiments, the proximal bending area of the airbag includes a side flow opening width along a line passing laterally through the proximal most row of attachments locations 35A that is greater than 33 percent of the total width. The side flow opening width along this line extends between two points on the lateral seam 40 of the airbag and includes the lateral spaces between the outermost attachment locations 35A. These relative dimensions again contribute to improved air flow from the proximal end 10A to the distal end 10B and provide a more robust airbag.

In one particular application, the airbag includes a side flow opening width along the line passing laterally through the proximal most row of attachments locations 35A is 130 mm and the total width along the line between the two points on the lateral seam 40 of the airbag is 300 mm. In this application, the side flow opening width includes a lateral distance of 65 mm between the first attachment locations 35A and both adjacent portions of the peripheral seam 40. In at least some of the above embodiments (see airbag 500 of FIG. 12, for example), the proximal bending area 36 of the airbag includes at least a lower portion in which the longitudinal distances between adjacent rows of first and second attachment locations 35A and 35B is greater than the longitudinal distances between adjacent rows of second attachment locations 35B. This dimensional spacing forms as effective tether length for the airbag upon inflation. The larger spacing between adjacent rows of first and second attachment locations 35A and 35B contributes to a more stable bend shape and an improved gas flow.

In the embodiments illustrated and described herein, the knee airbags may be one piece woven (OPW) airbags. As such, the front panel 28A, the rear panel 28B and the intermediate panel 28C may be formed by weaving using OPW technology.

Deployment of the knee airbag 10 occurs in response to activation of the inflator 14. The inflator 14 activates in response to a sensed condition indicating a predetermined vehicle collision or event. The inflator 14, its activation, and the sensing of the vehicle collision or event will be understood to be conventional insofar as the present teachings are concerned. The inflator 14 delivers inflation gases through the holes 10 of the diffuser panel 48 to inflate the knee airbag 10.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure. The various features of the present teachings may be used independently or in various combinations.

What is claimed is:

1. A knee airbag comprising:
a front panel;
a rear panel coupled to the front panel to define an inflation chamber; and
an intermediate panel between the front panel and the rear panel and within the inflation chamber, the intermediate panel connected to the rear panel by rows of first attachment points extending in a lateral direction across the knee airbag and the intermediate panel connected to the front panel by rows of second attachment points extending in the lateral direction;
wherein the airbag includes a proximal bending area proximate a proximal end thereof, the intermediate panel being connected to each of the front panel and the rear panel within the proximal bending area, and
wherein the airbag includes an open width along a line passing through a proximal most row of first attachments locations of the proximal bending area that is greater than a closed width along the line, and wherein the rows of first attachment points and the rows of second attachment points each include a plurality of attachment points spaced apart from one another in the lateral direction such that inflation gas can pass between adjacent attachment points.

2. The knee airbag of claim 1, further comprising an inflator for inflating the knee airbag disposed in the inflation chamber at a proximal end of the knee airbag.

3. The knee airbag of claim 1, wherein the open width is at least twice as great as the closed width.

4. The knee airbag of claim 1, wherein the open width is defined by a first side opening laterally between the proximal most row of first attachments locations and a first portion of a peripheral seam connecting the first panel and the rear panel, a second side opening laterally between the proximal most row of first attachments locations and a second portion of a peripheral seam connecting the first panel and the rear panel, and spaces laterally between the first attachment of the proximal most row of first attachments locations, and further wherein the closed width is defined by a collective width of the first attachment locations of the proximal most row of first attachments locations.

5. The knee airbag of claim 1, wherein the proximal most row of first attachment locations includes 3 first attachment locations.

6. A knee airbag comprising:
a front panel;
a rear panel coupled to the front panel to define an inflation chamber; and an intermediate panel between the front panel and the rear panel and within the inflation chamber, the intermediate panel connected to the rear panel by rows of first attachment points extending in a lateral direction across the knee airbag and the intermediate panel connected to the front panel by rows of second attachment points extending in the lateral direction;
wherein the airbag includes a proximal bending area proximate a proximal end thereof, the intermediate panel being connected to each of the front panel and the rear panel within the proximal bending area, and wherein the airbag at the proximal bending area has a side flow opening width along a line passing through a proximal most row of first attachments locations that is greater than 33 percent of a total width along the line, and wherein the rows of first attachment points and the rows of second attachment points each include a plurality of attachment points spaced apart from one another in the lateral direction such that inflation gas can pass between adjacent attachment points.

7. The knee airbag of claim 6, further comprising an inflator for inflating the knee airbag disposed in the inflation chamber at a proximal end of the knee airbag.

8. The knee airbag of claim 7, wherein the open width is at least 200 mm and the closed width is less than 100 mm.

9. The knee airbag of claim 6, wherein the knee airbag is a one-piece woven (OPW airbag).

10. The knee airbag of claim 6, wherein the side flow opening width is defined by a first side opening laterally between the proximal most row of first attachments locations and a first portion of a peripheral seam connecting the first panel and the rear panel and a second side opening laterally between the proximal most row of first attachments locations and a second portion of the peripheral seam, and further wherein the total width is defined by a distance laterally between the first and second portions of the peripheral seam.

11. The knee airbag of claim 10, wherein the side flow opening width along the line passing through the proximal most row of first attachments locations is greater than 40 percent of the total width along the line.

12. The knee airbag of claim 10, wherein the side flow opening width along the line passing through the proximal most row of first attachments locations is about 130 mm and the total width along the line is about 300 mm.

13. The knee airbag of claim 6, wherein the knee airbag is a one-piece woven (OPW airbag).

* * * * *